United States Patent
Prato et al.

(10) Patent No.: US 7,074,980 B2
(45) Date of Patent: Jul. 11, 2006

(54) PURIFICATION PROCESS OF CARBON NANOTUBES

(75) Inventors: Maurizio Prato, Trieste (IT); Vasilos Georgakilas, Nikea (GR)

(73) Assignee: Universita' Degli Studi di Trieste, Trieste (IT)

( * ) Notice: Subject to any disclaimer, the term of this patent is extended or adjusted under 35 U.S.C. 154(b) by 0 days.

(21) Appl. No.: 10/523,142

(22) PCT Filed: Jul. 29, 2003

(86) PCT No.: PCT/EP03/08350

§ 371 (c)(1),
(2), (4) Date: Jan. 31, 2005

(87) PCT Pub. No.: WO2004/013043

PCT Pub. Date: Feb. 12, 2004

(65) Prior Publication Data

US 2005/0234263 A1    Oct. 20, 2005

(30) Foreign Application Priority Data

Aug. 1, 2002  (IT)  ......................... MI2002A1737

(51) Int. Cl.
*C07C 7/10*  (2006.01)
(52) U.S. Cl. ...................... 585/839; 977/750
(58) Field of Classification Search .................. 977/750
See application file for complete search history.

(56) References Cited

OTHER PUBLICATIONS

Bandow, et al. "Purification and Magnetic Properties of Carbon Nanotubes" Applied Physics A 67, 1998, pp. 23-27.
Bonard, et al. "Purification and Size-Selection of Carbon Nanotubes" Advanced Materials, vol. 9. No. 10, pp. 827-831.
Boul. et al. "Reversible Sidewall Functionalization of Buckytubes" Chemical Physics Letters, 310, 1999, pp. 367-372.
Chiang, et al. "Purification and Characterization of Single-Wall Carbon Nanotubes" J. Phys. Chem B., 2001, 105, 1157-1161.
Georgakilas, et al. "Organic Functionalized Carbon Nanotubes" AIP Conf. Proc.(USA) 2002, 633, pp. 73-76.
Georgakilas, et al. "Organic Functionalization of Carbon Nanotubes" J. Am. Chem. Soc., vol. 124, No. 5, p. 760.
Georgakilas, et al. "Purification of HIPCO Carbon Nanotubes via Organic Functionalization" J. Am. Chem. Soc., 2002, 124, 14318-14319.

*Primary Examiner*—Paul A. Zucker
(74) *Attorney, Agent, or Firm*—Gifford, Krass, Groh, Sprinkle, Anderson & Citkowski, P.C.

(57) ABSTRACT

The present invention describes a new method for the purification of carbon nanotubes from contaminants deriving from industrial production, constituted by amorphous or carbon crystalline material and metals used for catalysis. The method provides for their organic furretionalization obtaining dirivatized nanotubes, precipitation of functionalized nanotubes and subsequent regeneration of non-functionalized nanotubes by heat treatment.

10 Claims, 2 Drawing Sheets

PURIFICATION PROCESS OF CARBON NANOTUBES

FIELD OF THE INVENTION

The present invention relates to a new method for the purification of carbon nanotubes through organic functionalization, precipitation and heat treatment and to the functionalized nanotubes.

STATE OF THE ART

Carbon nanotubes (NT) are carbon materials that are currently fabricated from graphite through procedures generally known as electric arc discharge, HIPCO (High-Pressure CO), laser-desorption, laser-ablation, plasma (PVD) or chemical vapor deposition (CVD). Following these treatments the initial material adopts a highly orderly structure constituted by one wall (single-walled nanotubes SWNT) or several walls (multiple-walled nanotubes MWNT) with miniaturized cylindrical shape varying in diameter and length according to the type of treatment, in which the carbon atoms combined together form a prevalently hexagonal honeycomb pattern. This particular arrangement providers these materials with unexpected and interesting chemico-physical and mechanical properties making them an extremely important material from the applicative aspect. The carbon nanotubes are in fact highly resistant to voltage which determines important electronic, optical and mechanical properties for the use of these materials in many fields of application as metal conductors or semi-conductors, insulating materials or materials with high mechanical strengths. They can thus be used in electronic and opto-electronic equipment (electrical and electronic microcircuits, diodes, transistors, sensors, field emission displays, vacuum fluorescent displays or sources of white light), and also polymeric compound materials with high electrical, thermal and mechanical strength. However, all the procedures generally used for fabrication provide a raw product with a great number of impurities, differing according to the method used, which include inert carbon particles, amorphous carbon, fullerenes and catalysis metals. These contaminants constitute serious limits both to their study and to their many uses. Various approaches have been taken to purify them, essentially based on: oxidization processes with acids or mixtures of acids (nitric and/or sulphuric, and/or hydrochloric acid) both in solution and gaseous, filtration, separation by centrifugation or chromatography. Whatever the approach used for purification, the first problem to be overcome is the question of their insolubility. For this aspect the initial material, before actual purification, is subjected in many cases to drastic dispersion processes in solvents or in water, such as pulverization, sonication or ultrasonication with or without surfactants. In any case these are purification processes that require several phases, even at high temperatures, in which the oxidizing treatment(s) with acids are essential and preferred to eliminate both metal and carbon contaminants. However, in this way the nanotubes are also impaired, destroying a part of them and introducing numerous structural defects with considerable influences on their chemico-physical and mechanical properties.

Chiang I. W. et al. (J. Phys. Chem. B 2001, 105, 8297–8301) describes a SWNT purification method through a high temperature oxidization process, obtaining a yield of about 30% and a high degree of purity. Nonetheless, this purification method, in addition to obtaining low yield rates, has the disadvantage of also oxidizing the NT, with consequent modifications in their molecular structure.

Therefore, as it is currently impossible to purify the nanotubes with a high degree of yield and purity at industrial level in a manner that safeguards them, they are usually marketed as they are produced.

In view of the fact that however they are fabricated, nanotubes are extremely costly materials and that for some industrial uses unshortened nanotubes without structural defects are preferred, the object of the present invention is to establish a purification method industrially applicable to the raw material, which has a good yield rate both as regards quantity and quality and which does not impair the structure of the nanotubes.

SUMMARY OF THE INVENTION

A new, non-destructive purification process for industrially produced nanotubes (pristine nanotubes p-NT), both SWNT and MWNT, has now been found, and is the object of the present invention, characterized by at least the following steps:

solubilization of the nanotubes (p-NT) through their organic functionalization in which the functionalization reaction is obtained on the nanotubes with 1,3-dipolar reaction of azomethine ylides and separation from metal contaminants, purification from carbon contaminants of functionalized nanotubes (f-NT) obtained in the previous step by precipitation with solvents from their organic solutions, heat treatment of functionalized nanotubes obtained in the previous step to regenerate the initial non-functionalized carbon nanotubes free of metal and carbon contaminants.

A further object of the invention relates to new functionalized nanotube obtained with the 1,3-dipolar reaction of functionalization azomethine ylides according to the first step.

DETAILED DESCRIPTION OF THE INVENTION

Figure 1:
FIG. 1: Transmission electron microscopy (TEM) images of pristine single-walled nanotube (p-SWNT)
Figure 1:

Solubilization of nanotubes, both SWNT and MWNT, through functionalization has been described by inventors starting out with materials prepared and purified according to conventional procedures (Georgakilas G. et. al. J. Am. Chem. Soc. 2002, 124, 760–761).

To attain the object of the present invention, the purification process involved in the present invention is characterized by the following phases:

solubilization through organic functionalization of nanotubes as produced industrially (pristine nanotubes p-NTY through 1,3-dipolar reaction of azomethine ylides and separation from metal contaminants, purification of functionalized nanotubes (f-NT) by precipitation with solvents from organic solutions of functionalized nanotubes, heat treatment of functionalized, nanotubes (f-NT) to regenerate the initial non-functionalized nanotubes.

When establishing the purification process described it was unexpectedly discovered that the functionalization reaction of the nanotubes can also be obtained when the initial material is a raw material containing metal contaminants deriving from industrial production and that each of the phases required contributes towards purification of the initial raw product, but that only through a combination of these is a final product with a high level of purity obtained.

In detail, the purification method established is as described hereunder.

The industrial nanotubes (p-NT), represented by raw material produced according to any one of the production processes mentioned hereinbefore, are functionalized through a 1,3-dipolar reaction which involves the p-nanotubes and the following components:

a) compounds with a general formula 1

   1 where R', R" and R''' equal to or different from one another may be:

H or alkyl groups with the formula $C_nH_{2n+1}$ with n between 1 and 20, or an aromatic group, or limited to R', R''' an ether group with the formula $(CH_2CH_2O)_n$ with n between 1 and 20 and b) compounds with a general formula 2

   2 where R'''' may be H or an alkyl group with the formula $C_nH_{2n+1}$ with n between 1 and 20, or an ether group with the formula $(CH_2CH_2O)_n$ with n between 1 and 20, or an aromatic group.

The functionalization reaction is conducted in a dipolar aprotic solvent chosen from the group constituted by dimethylformamide (DMF), dimethylsulphoxide, sulpholane, orthodichlorobenzene with reagents in excess and temperature over 100° C. for at least 24 hours.

Any functionalized nanotubes obtained through the 1.3-dipolar reaction of azomethine ylides, being soluble, can be used in the purification process of p-nanotubes. Furthermore, respect to the paper cited (Georgakilas G. et. al. 2002, ref.cit.), the functionalized nanotubes obtained through the reaction above mentioned are also new except when R', R", R''' and R'''' are equal to one another and equal to H; R' is equal to an ether group with the formula —(CH$_2$CH$_2$O)$_3$—CH$_3$ and R", R''' and R'''' are equal to one another and equal to H; R' is equal to an alkyl group with the formula —CH$_2$(CH$_2$)$_6$CH$_3$ and R", R''' and R'''' are equal to one another and equal to H; R' is equal to an ether group with the formula —(CH$_2$CH$_2$O)$_3$—CH$_3$, R", R''' are equal to each other and equal to H and R'''' is equal to -phenyl-OCH$_3$; R' is equal to an ether group with the formula —(CH$_2$CH$_2$O)$_3$—CH$_3$, R", R''' are equal to each other and equal to H and R'''' is equal to a pyrene group.

Purely for non-limiting explanatory purposes of the present invention, a typical process for functionalization of commercial nanotubes is described hereunder.

EXAMPLE 1

Organic Functionalization Reaction 100 mg of SWNT carbon nanotubes are suspended in 300 ml of dimethylformamide (DMF). The mixture is heated to 140° C. and a solution of N-octylglycine ethyl ester in DMF (500 mg in 10 ml) is added in portions of 2 ml every 24 hours with 500 mg of paraformaldehyde each time. Lastly, after 50 hours, 500 mg of N-octylglycine ethyl ester and 2.5 g of aldehyde are added to the initial suspension. The mixture is heated for a further 72 hours.

EXAMPLE 2

Organic Functionalization Reaction 1.00 mg of SWNT carbon nanotubes are suspended in 300 ml of dimethylformamide (DMF). The mixture is heated to 140° C. and a solution of N-methylglycine in DMF (500 mg in 10 ml) is added in portions of 2 ml every 24 hours with 500 mg of n-heptaldehyde each time. Lastly, after 50 hours, 500 mg of N-methylglycine and 2.5 g of aldehyde are added to the initial suspension. The mixture is heated for a further 72 hours.

In both examples the organic phase is separated by filtration on paper under vacuum and the solution is transferred to a rotary evaporator where the DMF is removed quantitatively. The remaining brown oily residue is diluted in 200 ml of dichloromethane and washed with water (5×200 ml). The organic phase is dried over Na$_2$SO$_4$ and after being filtered (to remove the Na$_2$SO$_4$) the solution is concentrated under vacuum. The residue is dissolved in 2 ml of dichloromethane and subsequently 10 ml of methanol is added to the mixture. The solid part that surfaces after adding the methanol is separated by centrifugation or filtering and washed repeatedly with methanol, until the alcohol phase no longer colours.

The products resulting from this reaction (functionalized nanotubes f-NT) have a high level of solubility in organic solvents, in which the metal particles present remain insoluble and are therefore eliminated with conventional mechanical means such as filtration under vacuum, centrifugaton, etc. The organic phase containing the f-NT is concentrated to eliminate the reaction solvent and the residue is dissolved in polar or apolar solvents chosen fom the group constituted by dichloromethane, chloroform, toluene, washed several times with water. The organic phase is then dried and concentrated after removing the drying agent. The functionalized nanotubes (f-NT) again solubilized in polar or apolar solvents chosen from the group constituted by dichloromethane, chloroform, toluene are then precipitated with one or more treatments with polar or apolar solvents chosen from the group constituted by diethylether, petroleum ether, alkanes, alcohols, separated with mechanical means (for example centrifugation or filtration) and washed once or several times with the same solvent used for precipitation.

The precipitated nanotubes (f-NT) obtained are again dissolved with organic solvents chosen from the group constituted by chloroform and methylene chloride. The subsequent precipitation phase, as described hereinbefore, is performed with polar or apolar organic solvents chosen from the group constituted by diethylether, petroleum ether, alkanes, alcohols, separated with mechanical means (for example centrifugation or filtration). In this phase the contaminants constituted by amorphous carbon materials remaining in solution are eliminated and therefore precipitations with solvents may be one or several according to the degree of purity to be obtained. The precipitation phase can be repeated several times on the nanotubes remaining in the solution until no precipitates are obtained.

The purified f-NT deriving from the precipitation phase are then defunctionalized by dry heating in an atmosphere with air, or inert gases, such as nitrogen or argon, or preferably under vacuum, at temperatures ranging from 250° to 350° C. for times between 1 minute and one hour. The initial nanotubes, without the contaminants from industrial production, are thus obtained after heat treatment with mechanical means chosen from centrifugation and filtration of suspensions obtained by sonication of these in polar or apolar solvents chosen from the group constituted by dichloromethane, chloroform, toluene.

Purely for non-limiting explanatory purposes of the present invention, a typical purification process performed on functionalized nanotubes is described hereunder.

EXAMPLE 3

Purification of Functionalized Nanotubes 80 mg of functionalized nanotubes according to example 1 and obtained using N—($CH_2CH_2OCH_2CH_2OCH_2CH_2OCH_3$)-glycine with paraformaldehyde are dissolved in 300 ml of $CHCl_3$. In this way a transparent brown solution is obtained. Diethylether is added in drops to the solution under stirring at ambient temperature. This is added until a precipitate appears. The solution is filtered and diethylether is once again added. The precipitate is recovered from the paper filter dissolving it in $CH_2Cl_2$. After the $CH_2Cl_2$ has evaporated, the solid material is washed with diethylether, centrifuged and dried under vacuum. This procedure is repeated three times; three precipitates (P1, P2 e P3) are obtained. Moreover, after evaporation of the chloroform, the material that had not yet precipitated (S) is also obtained in solid state.

The precipitates P1, P2 and P3 appear respectively after the addition of 480, 300 and 300 ml of diethylether, each of these precipitates is equal to about 10 mg; S is equal to 50 mg with a total yield of 100%.

The purity of each of these fractions is determined by TEM analysis.

EXAMPLE 4

Defunctionalization and Regeneration of Nanotubes 2 mg of functionalized nanotubes are placed in a metal (aluminium) capsule and heated to 300° C. under a flow of nitrogen for 30 minutes. The capsule is transferred to a conical flask containing 20 ml of dichloromethane, where the content of the capsule is freed in suspension in the organic phase through 10–20 sec of sonication in a normal ultrasonic bath. The solid product is separated by centrifugation or filtering, washed with 10 ml of chloroform and dried under vacuum for 2 hours. At the end of this step 1.4 mg of purified nanotubes have been obtained with a yield of 100%.

The results obtained with the process described are set down hereunder.

Figure 2:
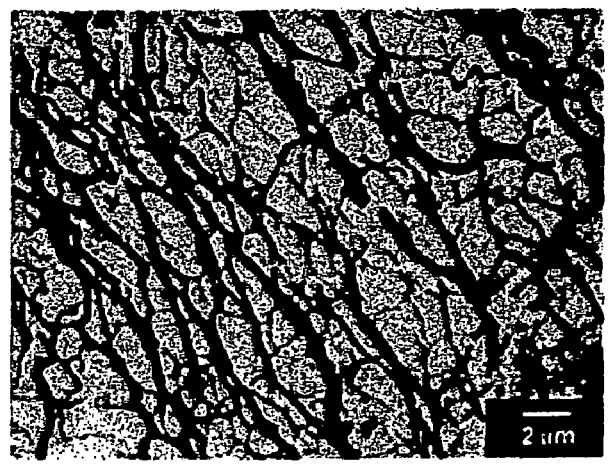
FIG. 2: Transmission electron microscopy (TEM) image of functionalized single-walled nanotube (f-SWNT)

FIG. 1 shows trasmission electron microscopy (TEM) of the nanotubes (p-SWNT) before functionalization and precipitation containing high quantities of metal particles and carbon materials and FIG. 2 those obtained after functionalization (f-SWNT) with no traces of metal particles and with no carbon materials.

Figure 3:
FIG. 3: Transmission electron microscopy (TEM) images of de-functionalized single-walled nanotube at the end of purification process.
Figure 3:
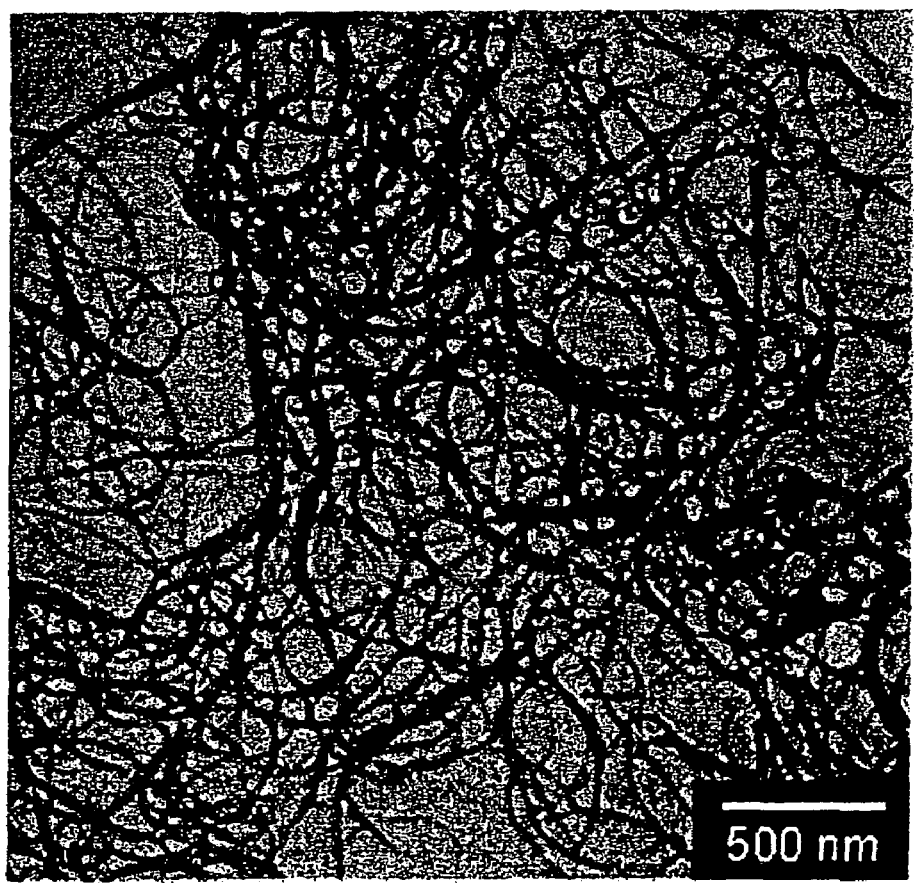

FIG. 3 shows the TEM photographs obtained on the nanotubes after precipitation with solvents and heat treatment.

Moreover, it must be pointed out that the initial nanotubes (p-SWNT) and those obtained at the end of the purification process after heat treatment (r-SWNT) were subjected to UV-Vis-NIR and IR-Raman analysis. The results show that the two types of nanotubes have the same electronic behaviour, confirming that the purification process has not caused any structural damage to the nanotubes thus purified.

Substantially, by adopting the purification process described, the same results are obtained starting out with p-SWNT and with the p-MWNT type. Without departing from the scope of the invention it is possible for those skilled in the art to make all the modifications and improvements to the process described in and the object of the present invention suggested, by normal experience and development in the technique.

The invention claimed is:

1. Purification process of carbon nanotubes characterized in that it comprises at least the following steps,
   solubilization of the carbon nanotubes (p-NT) through their organic functionalization in which the functionalization reaction is obtained on the nanotubes with 1,3-dipolar reaction of azomethine ylides and separation from metal contaminants,
   purification from carbon contaminants of functionalized carbon nanotubes (f-NT) obtained in the previous step by precipitation of functionalized carbon nanotubes with solvents from their organic solutions,
   heat treatment of functionalized carbon nanotubes obtained in the previous step to regenerate the initial non-functionalized carbon nanotubes free from traces of metal and carbon contaminants.

2. Purification process of carbon nanotubes as claimed in claim 1 wherein the carbon nanotubes are functionalized through a 1,3-dipolar reaction with:
   a) compounds with a general formula 1

   R'—NH—CHR"—COOR'''                    1 where R', R" and R''' equal to or different from one another may be H or alkyl groups with the formula $C_nH_{2n+1}$ with n between 1 and 20, or an aromatic group, or limited to R', R''' an ether group with the formula $(CH_2CH_2O)_n$ with n between 1 and 20 and
   b) compounds with a general formula 2

   R''''—CHO                              2 where R'''' may be H or an alkyl group with the formula $C_nH_{2n+1}$ with n between 1 and 20, or an ether group with the formula $(CH_2CH_2O)_n$ with n between 1 and 20, or an aromatic group.

3. Purification process of carbon nanotubes as claimed in claim 2 wherein the 1,3-dipolar reaction is conducted in dipolar aprotic solvent chosen from the group constituted by dimethylformamide (DMF), dimethylsulphoxide, sulpholane, orthodichlorobenzene with reagents in excess and temperature over 100° C. for at least 24 hours.

4. Purification process of carbon nanotubes as claimed in claim 1 wherein the separation from metal contaminants is obtained with mechanical means chosen from filtration and centrifugation of the organic solution deriving from the functionalization reaction of raw carbon nanotubes.

5. Purification process of carbon nanotubes as claimed in claim 1 wherein purification from carbon contaminants is obtained starting out with an organic solution containing functionalized carbon nanotubes in polar or apolar solvents, chosen from the group constituted by methylene chloride and chloroform, by precipitation with one or more treatments with polar or apolar solvents, chosen from the group constituted by diethylether, petroleum ether, alkanes, alcohols and separation with mechanical means chosen from centrifugation and filtration.

6. Purification process of carbon nanotubes as claimed in claim 1 wherein the initial carbon nanotubes are obtained by dry heating the functionalized carbon nanotubes in an atmosphere with air or inert gases at temperatures ranging from 250° to 350° C. for times between 1 minute and one hour.

7. Purification process of carbon nanotubes as claimed in claim 1 wherein the initial carbon nanotubes are obtained by dry heating the functionalized carbon nanotubes at temperatures ranging from 250° to 350° C. for times between 1 minute and one hour under vacuum.

8. Purification process of carbon nanotubes as claimed in claim 1 wherein the initial carbon nanotubes defunctionalized by heat treatment are separated with mechanical means chosen from centrifugation and filtration of their suspensions obtained by sonication in polar or apolar organic solvents chosen from the group constituted by dichloromethane, chloroform, toluene.

9. Functionalized carbon nanotubes obtainable with 1,3-dipolar reaction with the carbon nanotubes and:
   a) compounds with a general formula 1

R'—NH—CHR"—COOR'''      1 where R', R" and R''' equal to or different from one another may be H or alkyl groups with the formula $C_nH_{2n+1}$ with n between 1 and 20, or an aromatic group, or limited to R', R''' an ether group with the formula $(CH_2CH_2O)_n$ with n between 1 and 20 and
   b) compounds with a general formula 2

R''''—CHO      2 where R'''' may be H or an alkyl group with the formula $C_nH_{2n+1}$ with n between 1 and 20, or an ether group with the formula $(CH_2CH_2O)_n$ with n between 1 and 20, or an aromatic group except for compounds in which: R', R", R''' and R'''' are equal to one another and equal to H; R' is equal to an ether group with the formula —$(CH_2CH_2O)_3$—$CH_3$ and R", R''' and R'''' are equal to one another and equal to H; R' is equal to an alkyl group with the formula —$CH_2(CH_2)_6CH_3$ and R", R''' and R'''' are equal to one another and equal to H; R' is equal to an ether group with the formula —$(CH_2CH_2O)_3$—$CH_3$, R", R''' are equal to each other and equal to H and R'''' is equal to -phenyl-$OCH_3$; R' is equal to an ether group with the formula —$(CH_2CH_2O)_3$—$CH_3$, R", R''' are equal to each other and equal to H and R'''' is equal to a pyrene group.

10. Functionalized carbon nanotubes obtainable with 1,3-dipolar reaction as claimed 9 in which said reaction is conducted in a dipolar aprotic solvent chosen from the group constituted by dimethylformamide (DMF), dimethylsulphoxide, sulpholane, orthodichlorobenzene with reagents in excess and temperature over 100° C. for at least 24 hours.

* * * * *